(No Model.) 5 Sheets—Sheet 1.
F. J. PETERSEN, W. C. EBERHARDT & G. A. PIPER.
CASH REGISTER.
No. 546,342. Patented Sept. 17, 1895.
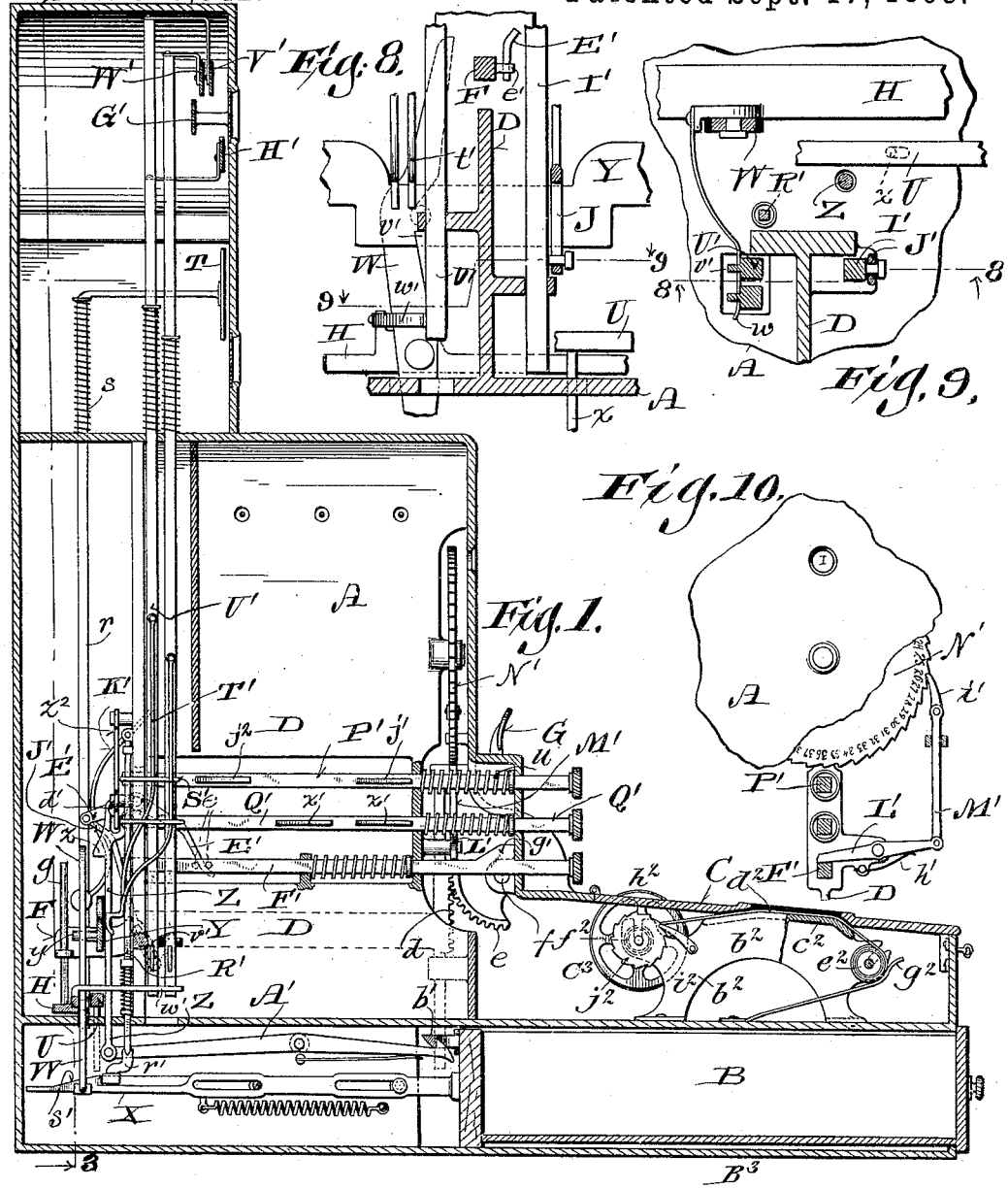
Witnesses:
Geo. W. Louey
N. E. Oliphant
Inventors:
Fred J. Petersen
Wm. C. Eberhardt
Gustav A. Piper
By H. G. Underwood
Attorney (No Model.) 5 Sheets—Sheet 2.
F. J. PETERSEN, W. C. EBERHARDT & G. A. PIPER.
CASH REGISTER.
No. 546,342. Patented Sept. 17, 1895.
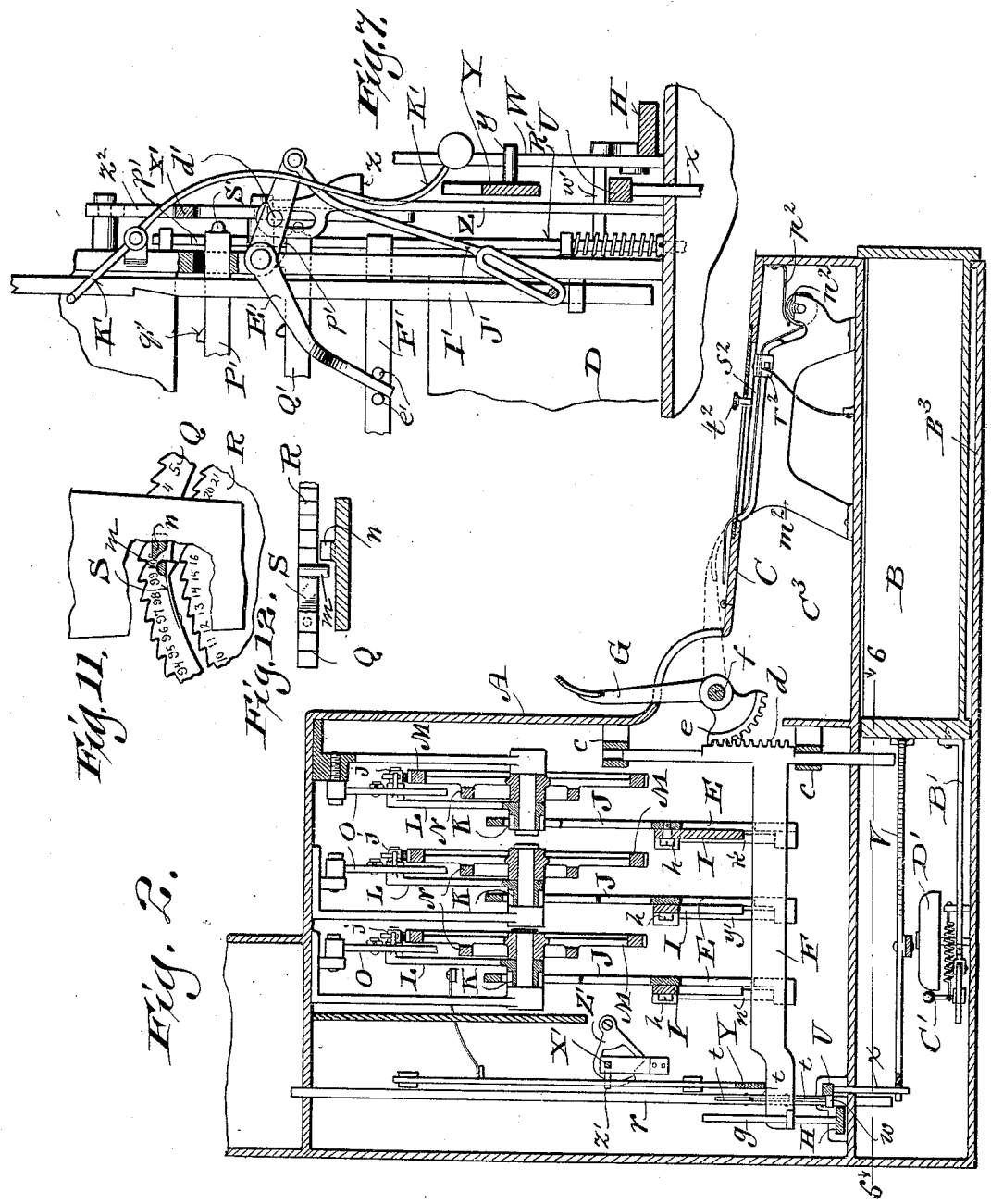
Witnesses:
Geo. W. Loury,
N. E. Oliphant
Inventors:
Fred J. Petersen
Wm. C. Eberhardt
Gustav A. Piper
By H. G. Underwood
Attorney (No Model.) 5 Sheets—Sheet 3.
F. J. PETERSEN, W. C. EBERHARDT & G. A. PIPER.
CASH REGISTER.
No. 546,342. Patented Sept. 17, 1895.
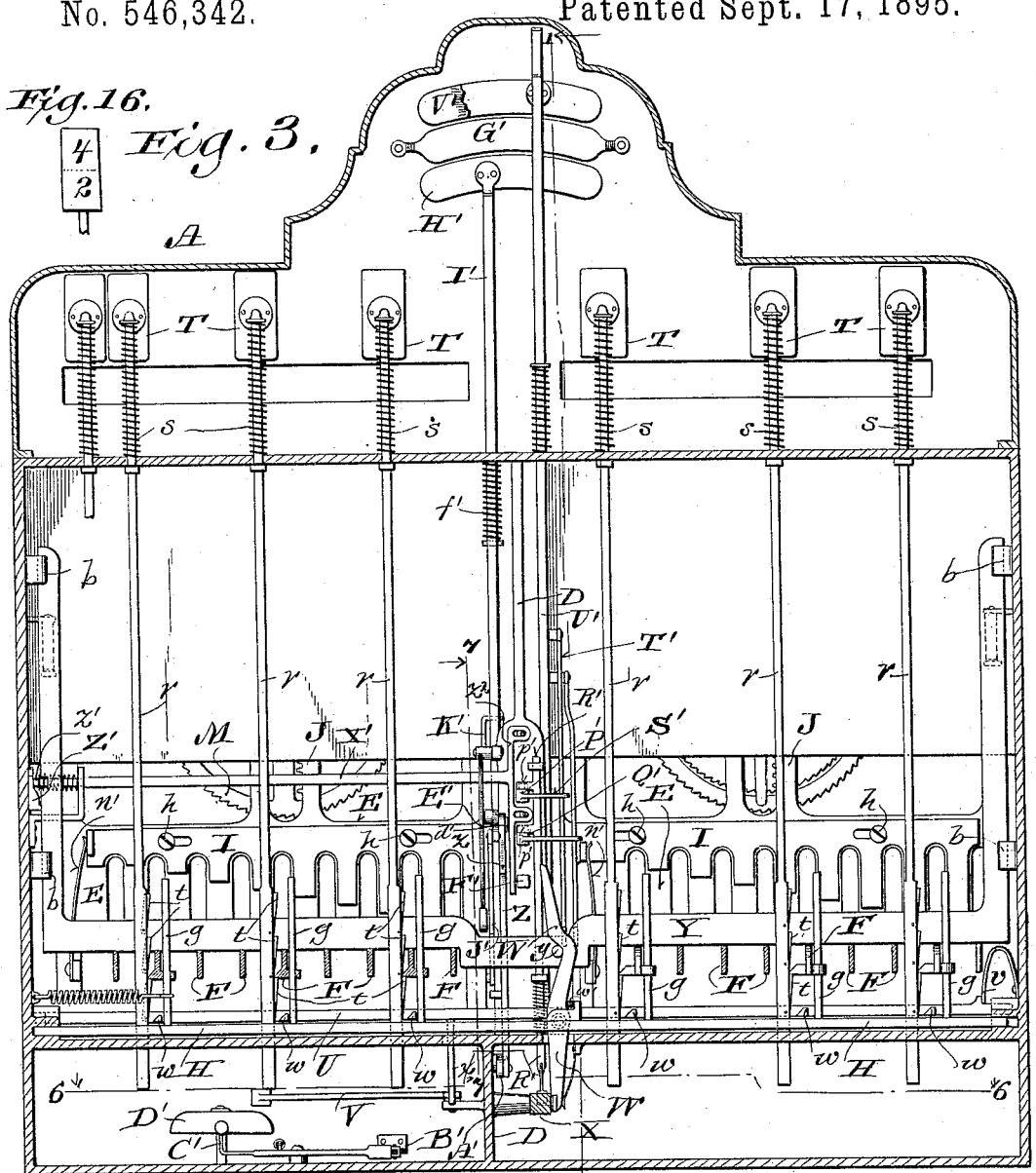
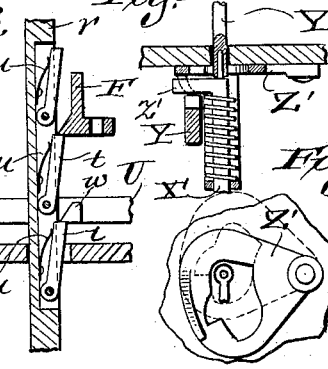
Witnesses:
Geo. W. Young,
N. E. Oliphant.
Inventors:
Fred J. Petersen
Wm. C. Eberhardt
Gustav A. Piper,
By H. G. Underwood
Attorney (No Model.) 5 Sheets—Sheet 4.
F. J. PETERSEN, W. C. EBERHARDT & G. A. PIPER.
CASH REGISTER.

No. 546,342. Patented Sept. 17, 1895.

Witnesses:
Geo. W. Toury.
N. E. Oliphant

Inventors
Fred J. Petersen
Wm C. Eberhardt
Gustav A. Piper
By H. G. Underwood
Attorney (No Model.) 5 Sheets—Sheet 5.

F. J. PETERSEN, W. C. EBERHARDT & G. A. PIPER.
CASH REGISTER.

No. 546,342. Patented Sept. 17, 1895.

Witnesses
Geo. W. Young.
N. E. Oliphant.

Inventors
Fred J. Petersen
Wm. C. Eberhardt
Gustav A. Piper
By H. G. Underwood
Attorneys

UNITED STATES PATENT OFFICE.

FRED J. PETERSEN AND WILLIAM C. EBERHARDT, OF PLYMOUTH, AND GUSTAV A. PIPER, OF SHEBOYGAN, WISCONSIN.

CASH-REGISTER.

SPECIFICATION forming part of Letters Patent No. 546,342, dated September 17, 1895.

Application filed September 8, 1894. Serial No. 522,445. (No model.)

*To all whom it may concern:*

Be it known that we, FRED J. PETERSEN and WILLIAM C. EBERHARDT, residing at Plymouth, and GUSTAV A. PIPER, residing at Sheboygan, county of Sheboygan, State of Wisconsin, citizens of the United States, have invented certain new and useful Improvements in Cash-Registers; and we do hereby declare that the following is a full, clear, and exact description thereof.

Our invention has for its object to provide a simple, economical, and accurate cash-register capable of use in connection with a variety of business transactions; and it consists in certain peculiarities of construction and combination of parts hereinafter set forth, with reference to the accompanying drawings, and subsequently claimed.

Figure 4:
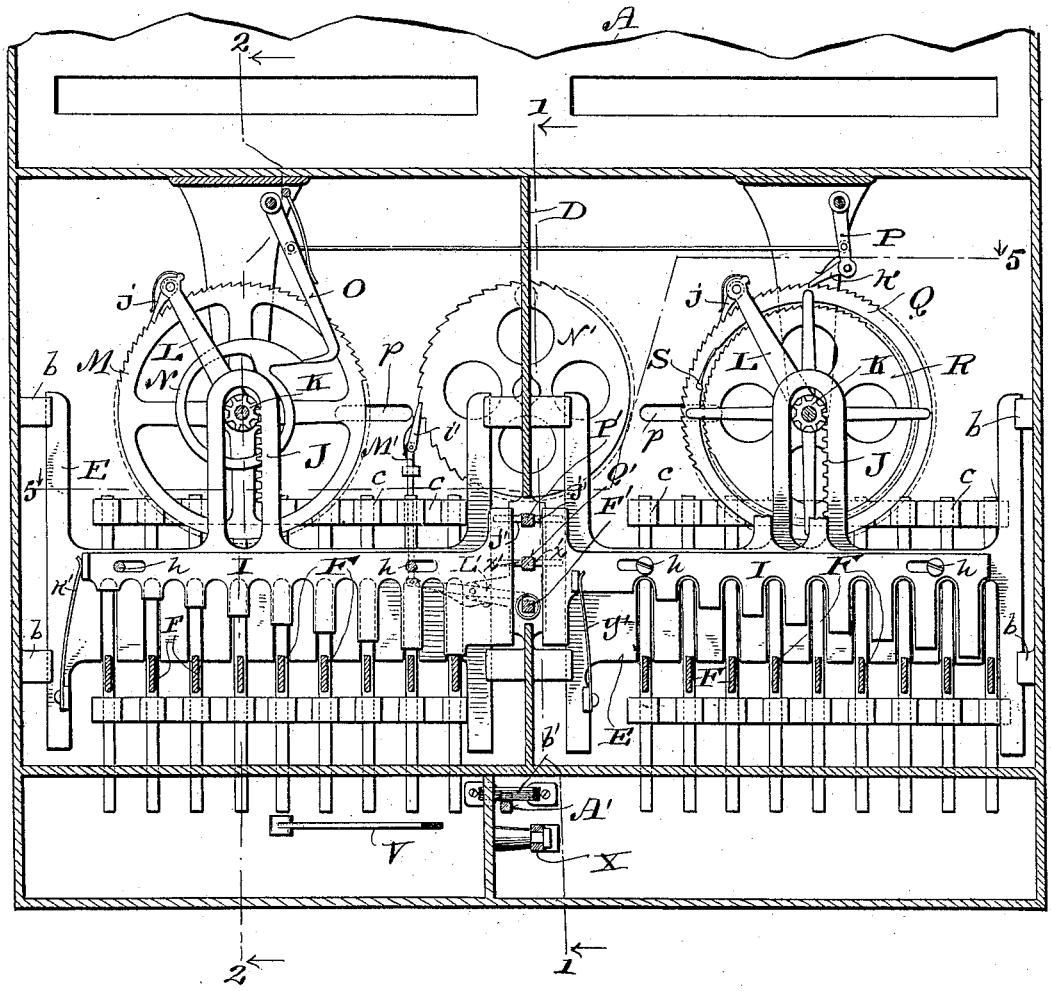
Figure 5:
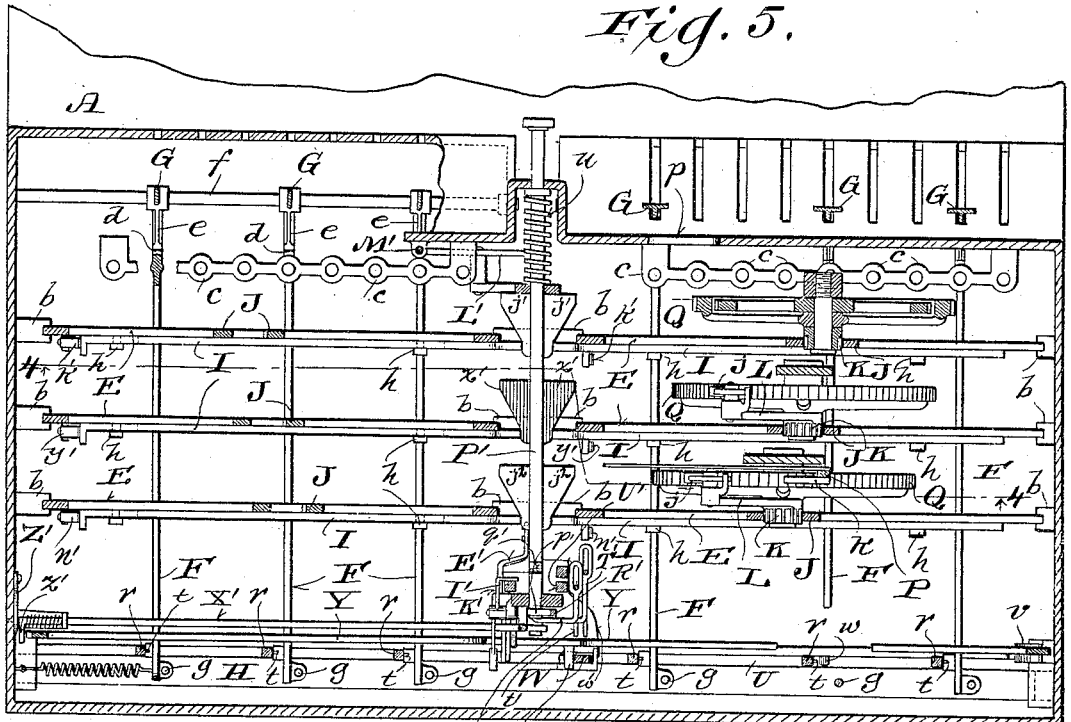
Figure 6:
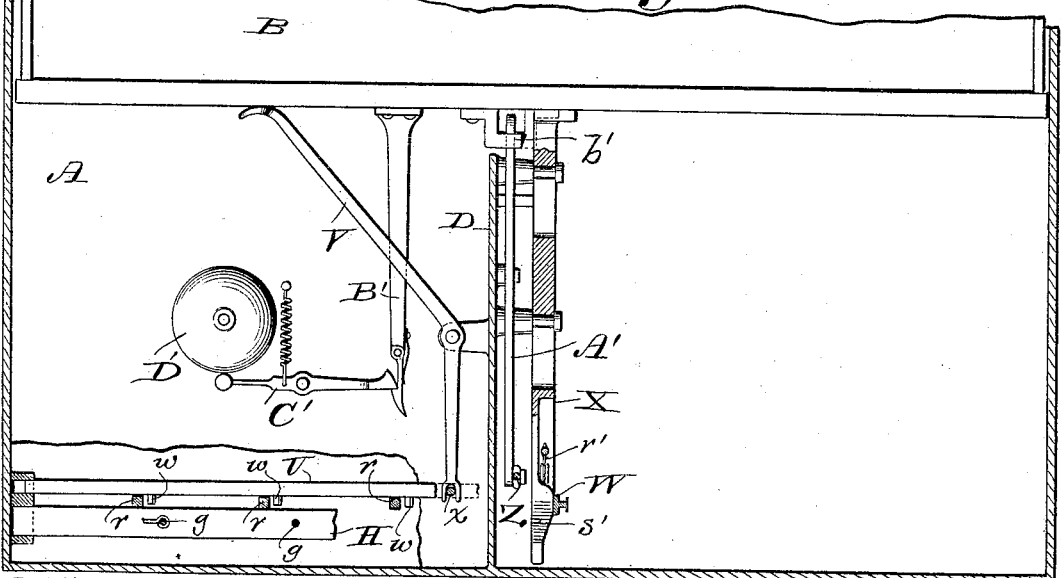

In the drawings, Figure 1 represents a transverse section of our cash-register, taken on line 1 1 of Figs. 3 and 4; Fig. 2, a similar view taken on line 2 2 of Fig. 4; Fig. 3, a rear view on line 3 3 of Fig. 1; Fig. 4, a vertical longitudinal section taken on line 4 4 of the succeeding figure; Fig. 5, a horizontal section taken on line 5 5 of the preceding figure, a number of lifting-bars and key-levers being omitted to render the showing more clear; Fig. 6, a detail horizontal section taken on line 6 6 of Figs. 2 and 3; Fig. 7, a detail transverse section taken on line 7 7 of Fig. 3; Fig. 8, a detail sectional view taken on line 8 8 of the succeeding figure; Fig. 9, a horizontal section on line 9 9 of the preceding figure; Fig. 10, a detail view illustrating a mechanism that operates to register the opening of the cash-drawer for purposes other than to deposit money; Figs. 11 and 12, detail views of an adding mechanism constituting part of our register; Fig. 13, a similar view of an indicator mechanism; Figs. 14 and 15, like views of a lock mechanism, and Fig. 16 a face view of an indicator-tag.

Referring by letter to the drawings, A represents the casing of our cash-register, the same having an extended lower portion $B^3$, containing a cash-drawer B, that opens automatically in the manner hereinafter described. Above the drawer, in the extended lower portion of the casing, is a compartment $C^3$, that is closed by a hinged lid C and serves as a cashier's desk, the lid being held closed when necessary by means of a suitable lock, the latter and its key being shown in Fig. 1. We also show in Fig. 1 that the cashier's desk may be provided with a stand comprising side pieces $b^2$, united at their upper edges by a transverse support $c^2$ for a paper apron $d^2$, traveled from one roller $e^2$ to another $f^2$, these rollers being journaled in said side pieces. A spring $g^2$ is arranged to bear against the paper on the feed-roller to thereby keep the latter snug in its bearings, and the exhaust-roller has a hand-wheel $h^2$, extended through a suitable opening in the desk-lid. The exhaust-roller is held against reverse movement by means of a pawl $i^2$ and ratchet $j^2$, and the paper apron is traveled past an opening in the desk-lid, said apron being for the reception of various business records or memoranda.

As shown in Fig. 2, another stand $m^2$ is arranged within the cashier's desk, and journaled in this latter stand is a roll $n^2$ of paper, held in its bearings by a suitable spring $p^2$. The paper is run over the stand through a slot in the desk-lid, and a spring-controlled reciprocative slide $r^2$, loose on said stand, is provided with a spring push-bar $s^2$, having a handle $t^2$, that works in an opening in the desk-lid. The paper may be blank for memoranda or it may be a succession of sale-tickets, and said paper is torn off against an edge of the slot through which it is fed.

Within the main portion of the casing the ends of the same and a central partition D are provided with guides $b$ for a series of combs E, that of themselves constitute guides for a series of right-angle lifting-bars F, the vertical or front portions of these bars being loose in other guides $c$ and provided with rack-teeth $d$, which latter are engaged by toothed segments $e$ at the inner ends of key-levers G, that are loose on longitudinal rods $f$, secured to said ends and partition of the casing. The key-levers engage slots in the front of the casing and are limited as to movement in either direction by the extremes of said slots.

The inner end of each lifting-bar F is in loose engagement with a vertical pin $g$, extending upward from a longitudinal spring-controlled plate H, loose in supports on the ends of the casing, within the latter.

Slotted finger-plates I are loosely engaged with screws $h$ or other suitable projections on the rear of the combs E, and springs are arranged to resist movement of said plates on the guide projections extending from said combs. Each comb is provided with a rack J, that engages a pinion K, loose on a spindle that is journaled in suitable bearings and has a ratchet-wheel loose thereon. A lever L, fast to each pinion, carries a spring-controlled pawl $j$, that operates in conjunction with the ratchet-wheel, and the teeth of the latter are of predetermined number to correspond with fractional divisions of any established currency.

The ratchet-wheels M on one side of the partition D are provided with cams N, and opposed to each cam is a spring-controlled lever O, linked to another lever P, that carries a spring-controlled pawl $k$, that engages one of the ratchet-wheels Q on the other side of said partition. Each time the greatest elevation of a cam N passes out of contact with a lever O the latter will drop in the notch of said cam, and, by its link connection with a pawl-lever P, the relative ratchet-wheel Q will be moved one space on its spindle. This operation takes place at each revolution of a ratchet-wheel M, and hence it will be seen that each ratchet-wheel Q is an adder for one of those aforesaid. Within each ratchet-wheel Q is another loose ratchet-wheel R, and a spring-pawl S on the former wheel has a projecting portion $m$, that is operated upon by a fixed cam $n$ to engage said pawl with the smaller ratchet-wheel, and thereby cause the latter to move one space on its supporting-spindle. This operation takes place at each revolution of a ratchet-wheel Q, and thus each ratchet-wheel R is an adder for the one by which it is encircled. In each series the ratchet-wheels are out of line with each other and in view through an aperture $p$ in the casing, it being intended in practice to successively number the teeth in the respective wheels, so that the amount of cash registered may be ascertained at any time, or, if found preferable in practice, the front of the casing may be made to open, so that the register-wheels may be observed.

As a matter of convenience in description we will assume that the ratchet-wheels are scaled to register amounts in United States currency, the ones M being for cents from one to ninety-nine, inclusive, those Q for dollars in like amounts, and the others R for hundreds of dollars, each tooth representing one hundred dollars.

In the present showing we provide for the registration of cash sales, expense paid from the drawer, and receipt of cash on account, there being three series of cent, dollar, and hundred-dollar ratchet-wheels.

The fingers of the plates I are of irregular lengths, and there is always one set of fingers in register with the lifting-bars F, this being the normal position of the fingers corresponding to the cash-sales-registering wheels. By mechanism hereinafter set forth the cash-sale fingers are thrown out of register with the lifting-bars and either the expense or cash-on-account fingers brought into register with said bars. It is evident that whenever a key-lever G is depressed one of the lifting-bars F is raised, and by coming into contact with a finger of one of the plates I the latter and comb in connection therewith will be elevated to operate the rack-and-pinion gear controlling a lever carrying a pawl engaged with one of the aforesaid ratchet-wheels, the rotation of the latter being proportionate to the travel of said finger-plate and comb. From the foregoing it will be understood that the greater the travel of a comb the greater the throw of a pawl-lever, and variable throw of this lever is a result of the variable length of fingers on the plate connected to the comb, it being readily observed that the lifting-bars in register with the shorter fingers will not effect their function as soon as those opposed to the longer fingers. Therefore it follows that each key-lever represents an arbitrary amount and its action will cause the registration of a like amount each time a depression occurs. In practice the key-levers will be indexed, and it follows from the foregoing description that a series of key-levers will represent amounts in cents and the remainder amounts in dollars. A series of staves $r$ work loose in horizontal partitions of the casing and carry indicating-tags T, that come in view through longitudinal slots in the upper rear portion of said casing, each staff being held in and returned to normal position by means of a supporting-spring $s$, a collar or other suitable stop being employed to limit upward travel of said staff. As shown in Fig. 16, each of the tags T is preferably a multiple indicator, or, in other words, a certain value is shown doubled on the same tag. It also follows that this scheme may be carried out indefinitely, the expressed amounts on any tag appearing in successive order from the lowest to the highest through a slot in the casing incidental to the operation of a lifting-bar F on the staff carrying said tag.

When multiple tags are employed, the lower portion of each staff is shown provided with a recess containing a series of pivotal dogs $t$, opposed by springs $u$, as best illustrated in Fig. 13, and these dogs successively come in the return-path of a lifting-bar F, whereby the staff is caused to move down against the resistance of its supporting-spring. A plate U, resisted by a spring $v$, is arranged in suitable guides and provided with a series of detents $w$ for the spring-resisted dogs pertaining to the staves $r$, whereby when any one of the latter is moved down by a lifting-bar it will be held in this adjusted position while said bar is again operated to bring another value on the relative tag into view, it being understood that these operations take place when the cash-drawer is open, for the reason that when said drawer is closed it pushes against a crank-lever V, and, the latter swinging on its fulcrum, the plate U is moved in its guides against the power of the spring $v$ to bring the detents $w$ clear of the stave-dogs $t$, this action being due to the engagement of said lever with a pin $x$ depending from said plate. Any staff moved down by a lifting-bar will be held in its adjusted position by the opposition of said bar to the spring-dog last engaged, even though the detent-plate be out of working position, until such time as one of the key-levers is operated, whereby, owing to the mechanism next described, the pin-plate H is moved in its guides to spring the inner ends of all the lifting-bars out of their normal path and release any of the staves that may have been moved down, these staves being then automatically returned to normal position by expansion of their supporting-springs, thus withdrawing the previously-exposed indicator-tags from view. A cam-lever W is hung loose on a stud extending laterally from the pin-plate H, and the foot of this lever is in the path of a spring-controlled longitudinally-slotted push-bar X, that is moved against the resistance of its spring by impact of the cash-drawer when the latter is closed. A yoke Y, arranged to reciprocate in suitable guides, has a lug $y$, that operates against the cam portion of the lever W, and, said yoke being in the path of the lifting-bars, its movement in an upward direction is a result of an operation of any one of said bars. A lifting-bar being operated, the yoke-lug $y$ works on the cam portion of the lever W to thereby move the pin-plate H against spring-resistance for the purpose of springing the inner ends of all the lifting-bars out of normal path, whereby any of the staves $r$ that have been moved down may be freed and automatically return to original position, the fulcrum of said lever during this operation being the wedge-like inner end of the push-bar X, against which it is preferably held by a suitable spring. If indicator-tags having single amounts expressed thereon be used, the detent-plate may be omitted and only one catch-dog employed in connection with each staff, this catch-dog being for the lifting-bar relative to said staff. As the yoke Y continues its upward movement it comes into lifting contact with a shoulder $z$ of a link Z, connected to a spring-controlled pivotal catch A', engaging a loop $b'$ on the rear of the cash-drawer, and, the catch being swung on its pivot, said drawer is released and pushed out by the spring-controlled bar X, although it follows that other spring mechanism may be utilized to aid the same operation. When the push-bar moves outward, the thin part of its wedge-like inner end is opposite the foot of the lever W and the latter is free to swing on its pivot, and thereby permit a return of the pin-plate H to normal position, after which the yoke Y may reciprocate as long as the cash-drawer is open without affecting said pin-plate, inasmuch as said lever is free on its pivot and without fulcrum to resist the lug $y$ on said yoke.

The rear of the cash-drawer is preferably provided with a bar B', carrying a spring-catch that operates a pivotal spring-controlled striker C' for a gong-bell D', whereby the opening of said cash-drawer is signaled.

From the foregoing it will be understood that a full depression of a key-lever G will cause an operation of the registering mechanism and an opening of the cash-drawer; but at times it is necessary to open said drawer without operating the registering mechanism. Hence we engage a longitudinal slot in the link Z with a lug $d'$ on an elbow-lever E', that has the outer end thereof arranged between a pair of lugs $e'$ on a spring-controlled push-plug F', projecting through the front of the casing, and by this arrangement of parts it will be readily seen that the drawer-latch may be released without depressing a key-lever.

Displayed through an opening in the front of the casing is a permanent sign G', denoting cash sales, and another sign H', denoting no sale, is affixed to a sliding rod I' to come in view and obscure the previous sign when the cash-drawer is opened by an operation of the plug F' above specified. The rod I' is arranged in suitable guides and lifted against the power of a spring $f'$ because of a lug engagement with the longitudinal slotted extremity of a link J', pivoted to the inner end of the elbow-lever E' above specified. The rod I' being lifted a notch therein will engage with a pivotal gravity-catch K' and be held in its elevated position to keep the attached sign in view until such time as the yoke Y is operated to tilt the gravity-catch and bring it out of engagement with said notch. The latter operation occurring, the expansion of the spring $f'$ will cause an automatic return of the rod I' and its attached sign to normal position.

The push-plug F' is provided with a cam-shoulder $g'$, that operates a lever L', resisted by a spring $h'$, in pivotal connection with a rod M', loose in a suitable guide and carrying a pawl $i'$, engaging a ratchet-wheel N', that has its teeth numbered, the numbers being observed through an opening in the casing, as shown in Fig. 10. By means of the mechanism just described we obtain a registration of the number of times the cash-drawer is opened without operating a key-lever.

In order to throw the cash-sales finger-plates out of working position and bring the expense or cash-on-account finger-plates into such position, we employ spring-controlled push-plugs P' Q', provided with cam-wings. The plug P' corresponds to expense transactions, and the cam-wings $j'$ thereon operate to push the cash-sales finger-plates out of working position against the resistance of springs $k'$, while the other cam-wings $j^2$ on said plug operate to force the expense finger-plates into working position against the resistance of springs $n'$; and when this action takes place a catch $p'$, extending from a spring-controlled rod $R'$, drops into the return-path of a shoulder $q'$ on the aforesaid push-plug to lock the latter in its adjusted position.

The lower end of the rod $R'$ is provided with a spring-foot $r'$, that engages a recess in the push-bar X above specified when the cash-drawer is closed. When the cash-drawer opens, a cam-shoulder on the push-bar swings the foot of the rod $R'$ out of the aforesaid recess, and on the return of said bar an inclined face $s'$ thereof lifts on said foot and rod to bring the catch $p'$ out of the way of the shoulder on the plug $p'$ above specified, whereby the spring controlling said plug automatically restores the same to normal position. As herein shown, the push-plug $P'$ has its inner end provided with a right-angle loop-stem $S'$, that engages a wire $T'$, attached to a rod $U'$, carrying a sign $V'$, denoting expense, and said wire has an inturned foot $t'$, that is brought in the return-path of the yoke Y to thereby pull said rod down in its guides against the resistance of a spring $u'$, and thus bring said sign into view, the cash-sales sign being obscured. The rod $U'$ has a shoulder $v'$, that comes into engagement with a spring catch-finger $w'$, extending from the pin-plate II, and thus the sign $V'$ is held in view until such time as an operation of the yoke-lug $y$ on the cam-lever W takes place to effect a longitudinal movement of said pin-plate in the direction necessary to disengage said catch-finger and rod-shoulder.

The push-plug $Q'$ corresponds to cash-on-account transactions and is provided with cam-wings $x'$, that operate to throw the cash-sales finger-plates out of working position and cash-on-account finger-plates into working position, the latter plates being resisted by springs $y'$, and said plug held in adjusted position by the opposition of a shoulder thereon to another catch on the spring-controlled rod $R'$ above specified. As a result of pushing in the cash-on-account push-plug and operating a key-lever a mechanism duplicating that employed in connection with the expense-sign is operated to display a cash-on-account sign $W'$, the latter being automatically returned to normal position by an action similar to that specified in conjunction with the aforesaid expense-sign.

In order that unauthorized persons may not tamper with the various mechanisms hereinbefore set forth, we employ suitable locking devices controlled by a single key and herein shown as comprising a spring-controlled horizontal rod $X'$, arranged in suitable guides and provided with right-angle end fingers $z'\,z^2$, the first of these fingers being for engagement with a notch in the yoke Y and the other as a stop in the path of the push-plugs $F'\ P'\ Q'$ above specified. The outer end of the rod $X'$ receives a key $Y'$, and the bit of the key turns a pivotal cam-plate $Z'$ to exert a push of said rod against the power of its controlling-spring, and thereby position the aforesaid fingers in working position, where they remain until said cam-plate is retracted.

Having thus described our invention, what we claim as new, and desire to obtain by Letters Patent, is—

1. A cash-register having its casing provided with an extension containing the cash-drawer and embodying a compartment constituting a cashier's desk, a stand in the desk, supply and exhaust rollers journaled in the stand, record-paper traveled from one to the other of the rollers past an opening in the desk-top or lid, a hand-wheel on the exhaust-roller extended through another opening in said desk-top or lid, and a pawl-and-ratchet mechanism arranged to prevent reverse operation of said exhaust-roller.

2. A cash-register having its casing provided with an extension containing the cash-drawer and embodying a compartment constituting a cashier's desk, a stand in the desk, a roll of paper having its bearings in the stand, the free end of the paper being run through a slot in the top or lid of said desk, a spring-controlled reciprocative slide on said stand provided with a spring-push bar, and a handle on the push-bar arranged to work in an opening in said desk-top or lid.

3. A cash-register comprising a series of right angle lifting-bars, having rack-toothed vertical portions, key-levers having toothed segmental inner ends in gear with the bars, a reciprocative plate having a series of fingers variable as to length and arranged in the paths of said bars, a rack-and-pinion gear operating incidental to movement of the finger-plate, a pawl-carrying lever controlled by the pinion, and a ratchet register wheel engaged by the pawl.

4. A cash-register comprising a series of lifting-bars, key-levers in gear with the bars, a reciprocative plate having a series of fingers variable as to length and arranged in the paths of said bars, a rack-and-pinion gear operating incidental to movement of the finger-plate, a pawl-carrying lever controlled by the pinion, a ratchet register wheel engaged by the pawl, a notched cam on the register wheel, a spring-controlled lever opposing the cam, another pawl-carrying lever linked to the lever opposing the cam, and another ratchet register wheel engaged by the latter pawl.

5. A cash-register comprising a series of lifting-bars, key-levers in gear with the bars, a reciprocative plate having a series of fingers variable as to length and arranged in the paths of said bars, a rack-and-pinion gear operating incidental to movement of the finger-plate, a pawl-carrying lever controlled by the pinion, a ratchet register wheel engaged by the pawl, a notched cam on the register-wheel, a spring-controlled lever opposing the cam, another pawl-carrying lever linked to the lever opposing the cam, another ratchet register wheel engaged by the latter pawl and of itself provided with a spring-pawl having a projection, still another ratchet register wheel encircled by the one provided with said spring-pawl, and a fixed cam arranged in the path of the projection on the latter pawl to cause a temporary engagement of this pawl with the inner register wheel.

6. A cash-register comprising a series of lifting-bars, key levers in gear with the bars, a reciprocative plate having a series of fingers variable as to length and arranged in the paths of said bars, a rack-and-pinion gear operating incidental to movement of the finger-plate, a pawl-carrying lever controlled by the pinion, a ratchet register wheel engaged by the pawl and of itself provided with a spring-pawl having a projection, another ratchet register wheel within the one aforesaid, and a fixed cam arranged in the path of the projection on the latter pawl to cause a temporary engagement of this pawl with the inner register wheel.

7. A cash-register comprising a series of lifting bars, key-levers in gear with the bars, reciprocative plates having a series of fingers variable as to length and arranged in the paths of said bars, rack-and-pinion gear operating incidental to movement of each plate, a pawl-carrying lever controlled by the pinion in each gear, ratchet register wheels engaged by the pawls, a notched cam on one of the register wheels, a spring-controlled lever opposing the cam, another lever linked to the cam-opposing lever and a pawl carried by the link-controlled lever to engage the other register wheel.

8. A cash-register comprising a series of lifting-bars, key-levers in gear with the bars, reciprocative plates having a series of fingers variable as to length and arranged in the paths of said bars, a rack-and-pinion gear operating incidental to movement of each plate, a pawl-carrying lever controlled by the pinion in each gear, ratchet register wheels engaged by the pawls, a notched cam on one of the register wheels, a spring-controlled lever opposing the cam, another lever linked to the cam-opposing lever, a pawl carried by the link-controlled lever to engage the other register-wheel, still another register wheel within the latter of the two aforesaid, and suitable means for automatically moving the same one space at each revolution of the encircling wheel.

9. A cash-register comprising a series of lifting-bars, key-levers in gear with the bars, a series of laterally adjustable plates each provided with fingers variable as to length, suitable means for shifting the plates to bring any desired set of fingers in the paths of said bars, rack-and-pinion gear operating incidental to reciprocative movement of each plate, and registering mechanisms actuated by operation of said gear.

10. A cash-register comprising a series of reciprocative combs, plates laterally adjustable on the combs and provided with fingers of variable length, lifting bars alternating with the comb-teeth, key-levers in gear with the lifting-bars, suitable means for shifting the plates on said combs to bring any desired set of fingers in the paths of said bars, rack-and-pinion gear operating incidental to reciprocative movement of each plate, and registering mechanism actuated by operation of said gear.

11. A cash register comprising a series of lifting-bars, key-levers in gear with the bars, suitable means for springing said bars out of their normal position upon the initial movement of any one thereof, a series of loose spring supported staves having projections that come in the return paths of the aforesaid bars, and indicator-tags on the staves.

12. A cash-register comprising a series of lifting-bars key-levers in gear with the bars, suitable means for springing said bars out of normal position upon the initial movement of any one thereof, a series of loose spring-supported staves each provided with a series of projections arranged to be successively opposed by a lifting-bar upon the returns movements of the latter, a reciprocative plate provided with detents for the stave-projections, suitable means for actuating the plate incidental to opening and closing of a cash-drawer in said register, and a multiple indicator tag on each staff.

13. A cash-register comprising a series of loose spring-supported staves each carrying a multiple indicator-tag and provided with a series of projections, suitable means for effecting longitudinal movement of each stave subsequent to the operation of a register mechanism, to thereby display an arbitrary amount on a corresponding indicator-tag, a spring-controlled plate provided with detents for the stave-projections, a pin depending from the plate, and a crank-lever connected to the pin to be actuated by the closing of a cash-drawer in said register.

14. A cash-register comprising a series of lifting-bars key-levers in gear with the same, a spring-controlled plate provided with pins engaging the inner ends of the bars, a cam-lever loose on a lateral projection of the pin-plate, a spring controlled push-bar in the inward path of a cash-drawer in the register and having a wedge-like inner end opposing the foot of the cam-lever, a reciprocative yoke operating incidental to movement on the part of any one of said bars, a lug on the yoke opposing the cam-lever, a drawer catch-mechanism, a trip for this catch-mechanism in the upward path of the yoke, a series of loose spring-supported staves having projections in the return paths of the aforesaid bars, and indicator-tags on the staves.

15. A cash-register comprising an automatically opening drawer, a catch for holding the same in closed position, a push-plug, trip-mechanism for the catch under control of the plug, a loose rod, a sign carried by the rod, a lever-and-link mechanism connecting said plug and rod, a catch for said rod, and a reciprocated yoke that trips the latter catch.

16. A cash-register comprising an automatically opening drawer, a catch for holding the same in closed position, a push-plug, a trip-mechanism for the catch under control of the plug, a ratchet register wheel, a pawl engaging the wheel, a spring controlled lever-mechanism for the pawl, and a cam-shoulder on said plug operative against the lever-mechanism to actuate said pawl.

17. A cash-register comprising an automatically opening drawer, a catch for holding the same in closed position, a push-plug provided with a cam-shoulder, a trip-mechanism for the catch under control of the plug, a loose rod, a sign carried by the rod, a lever-and-link mechanism connecting said plug and rod, a gravity catch for said rod, a reciprocative yoke that trips the latter catch, and a register mechanism actuated by movement of the cam-shoulder on said plug.

18. A cash-register comprising a series of lifting-bars, key-levers in gear with the same, vertically reciprocative laterally adjustable plates provided with fingers of variable length, a push-plug operating to effect a simultaneous lateral adjustment of plates to bring the fingers of one plate out of the paths of the lifting-bars and those of another plate in said paths, and an automatic catch-and-trip detent for the push-plug operating in conjunction with a drawer in the register, and registering mechanism operative incidental to each lift of a plate.

19. A cash-register comprising a series of lifting-bars, key-levers in gear with the same, vertically reciprocative laterally adjustable plates provided with fingers of variable length, a push-plug operating to effect a simultaneous lateral adjustment of plates to bring the fingers of one plate out of the paths of the lifting bars and those of another plate into said paths, an automatic catch-and-trip detent for the push-plug operating in conjunction with a drawer in the register, registering mechanism operative incidental to a lift of each plate, a spring-controlled rod carrying a sign, suitable means for actuating the rod against resistance of its spring subsequent to the shift of said plates by said push-plug, and other mechanism, a catch for the rod in its adjusted position, and other suitable means for releasing the catch incidental to a depression of any key-lever subsequent to a closing of the aforesaid drawer.

20. A cash-register comprising a series of lifting-bars, key-levers in gear with the same, vertically reciprocative combs constituting guides for the bars, a register mechanism operating in conjunction with each comb, plates movable laterally on the combs and provided with fingers variable as to length, a push-plug having wings operative against the plates to simultaneously shift the same on the combs to thereby bring the fingers of one plate out of the paths of said bars and those of another plate in said paths, a drawer, a spring-controlled push-bar in the return path of the drawer, a spring-controlled catch-and-trip detent for the push-plug operating in conjunction with the push-bar, a spring-controlled rod carrying a sign, a reciprocative yoke in the path of the lifting bars, a wire on the rod provided with an inturned foot that comes in the return path of the yoke when said push-plug is moved inward, a spring-controlled sliding plate having pins engaging the aforesaid lifting bars, a catch on the plate for the sign-rod, and a cam-lever pivoted on said plate and opposed by a lug on said yoke, the fulcrum of the lever being the wedge-like inner end of the aforesaid push-bar when the latter is in normal position.

21. A cash-register comprising a reciprocative yoke in the paths of lifting-bars actuated by key-levers and controlling various mechanisms, a series of push-plugs also controlling various mechanisms, and a lock for the yoke and plugs.

22. A cash-register comprising a reciprocative yoke in the path of lifting bars actuated by key-levers and controlling various mechanisms, a series of push-plugs also controlling various mechanisms, and a lock consisting of a spring controlled loose rod having a finger for engagement with a notch in the yoke and another finger for opposition to the inner ends of said plugs, and a pivotal cam-plate operated by a key to actuate said rod against the resistance of its controlling spring.

In testimony that we claim the foregoing we have hereunto set our hands, at Sheboygan, in the county of Sheboygan and State of Wisconsin, in the presence of two witnesses.

FRED J. PETERSEN.
WILLIAM C. EBERHARDT.
GUSTAV A. PIPER.

Witnesses:
PAUL T. KREZ,
A. C. KREZ.